(12) United States Patent
Pehlke

(10) Patent No.: US 12,525,999 B2
(45) Date of Patent: Jan. 13, 2026

(54) CONNECTIVITY ARCHITECTURE FOR ANTENNA SWITCHING

(71) Applicant: Skyworks Solutions, Inc., Irvine, CA (US)

(72) Inventor: David Richard Pehlke, Westlake Village, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 379 days.

(21) Appl. No.: 18/124,857

(22) Filed: Mar. 22, 2023

(65) Prior Publication Data

US 2023/0308119 A1    Sep. 28, 2023

Related U.S. Application Data

(60) Provisional application No. 63/322,788, filed on Mar. 23, 2022.

(51) Int. Cl.
  *H04B 1/00*    (2006.01)
(52) U.S. Cl.
  CPC ........... *H04B 1/006* (2013.01); *H04B 1/0078* (2013.01)
(58) Field of Classification Search
  CPC .............................. H04B 1/006; H04B 1/0078
  See application file for complete search history.

(56) References Cited

U.S. PATENT DOCUMENTS

| | | | |
|---|---|---|---|
| 8,417,196 B2* | 4/2013 | Kitching | H03F 3/19 455/127.3 |
| 8,670,797 B2* | 3/2014 | Asuri | H04B 1/0064 455/67.11 |
| 10,177,723 B2* | 1/2019 | Cassia | H03F 3/211 |
| 10,985,784 B2* | 4/2021 | King | H04B 7/0825 |
| 11,245,432 B2* | 2/2022 | Farahvash | H03H 7/38 |
| 11,258,470 B2* | 2/2022 | Duxbury | H04B 1/005 |
| 11,405,059 B2 | 8/2022 | Pehlke | |
| 11,601,144 B2 | 3/2023 | Loh et al. | |
| 2009/0130993 A1* | 5/2009 | Rofougaran | H04B 1/006 455/90.2 |
| 2012/0021697 A1* | 1/2012 | Yang | H04W 52/0251 455/73 |
| 2016/0056767 A1* | 2/2016 | Wang | H03F 3/211 330/251 |
| 2017/0288765 A1* | 10/2017 | Khlat | H04B 7/0413 |

(Continued)

*Primary Examiner* — Jinsong Hu
*Assistant Examiner* — Rui M Hu
(74) *Attorney, Agent, or Firm* — Knobbe, Martens Olson & Bear, LLP

(57) ABSTRACT

Disclosed is a radio frequency front-end (RFFE) architecture for sounding reference signal (SRS) antenna switching using a first power amplifier module (PAM) and a remote module (second PAM) to control local and remote antennas. The modules include various transmit and receive signal paths, power amplifiers and low-noise amplifiers, filters for signal conditioning, and switch blocks comprising a plurality of switches for selectively routing the signal paths. In certain embodiments, external bypass ports may be included to increase the connectivity of the modules and provide for additional operating modes of the FE. The FE SRS architecture advantageously reduces insertion losses (including switching losses), reduces component count and the number of external connections to the FE, and can provide improved isolation performance in a compact package.

20 Claims, 11 Drawing Sheets

(56) References Cited

U.S. PATENT DOCUMENTS

| | | | |
|---|---|---|---|
| 2018/0019768 A1* | 1/2018 | King | H04L 27/0002 |
| 2018/0145635 A1* | 5/2018 | Ishikawa | H03F 3/72 |
| 2018/0309528 A1* | 10/2018 | King | H04J 1/045 |
| 2019/0068127 A1* | 2/2019 | Ishikawa | H03F 3/195 |
| 2020/0028562 A1* | 1/2020 | Yang | H04B 7/0413 |
| 2020/0321929 A1* | 10/2020 | Daimon | H03F 3/245 |
| 2021/0098897 A1 | 4/2021 | Pehlke et al. | |
| 2021/0099199 A1 | 4/2021 | Pehlke et al. | |
| 2021/0099205 A1* | 4/2021 | Seyed | H04B 7/0805 |
| 2021/0218422 A1 | 7/2021 | Pehlke | |
| 2022/0069850 A1 | 3/2022 | Loh et al. | |
| 2022/0231710 A1 | 7/2022 | Pehlke | |
| 2022/0329266 A1 | 10/2022 | Pehlke | |
| 2023/0144780 A1 | 5/2023 | Pehlke | |
| 2023/0155622 A1 | 5/2023 | Raghavan et al. | |
| 2023/0370022 A1* | 11/2023 | Wiegner | H03F 3/245 |
| 2024/0283471 A1* | 8/2024 | Ono | H04B 1/00 |

* cited by examiner

CONNECTIVITY ARCHITECTURE FOR ANTENNA SWITCHING

CROSS-REFERENCE TO RELATED APPLICATIONS

This application claims the benefit of priority under 35 U.S.C. § 119 of U.S. Provisional Patent Application No. 63/322,788, filed Mar. 23, 2022 and titled "CONNECTIVITY ARCHITECTURE FOR ANTENNA SWITCHING," which is herein incorporated by reference in its entirety.

BACKGROUND OF THE INVENTION

Field of the Invention

Aspects of this disclosure relate to electronic systems, and in particular, to radio frequency electronics.

Description of the Related Art

Radio frequency (RF) communication systems can be used for transmitting and/or receiving signals of a wide range of frequencies. For example, an RF communication system can be used to wirelessly communicate RF signals in a frequency range of about 30 kHz to 300 GHz, such as in the range of about 400 MHz to about 7.125 GHz for Fifth Generation (5G) cellular communications in Frequency Range 1 (FR1) or in the range of about 24.250 GHz to about 71.000 GHz for Frequency Range 2 (FR2) of the 5G communication standard.

RF communication systems typically include an RF front-end which couples transmit and receive paths between a transceiver (which is coupled to a baseband processor) and one or more antennas. Such RF front-ends may include power amplifier(s), low noise amplifier(s), and/or filter(s) to process RF signals transmitted to and received from the antennas. Typically, the antennas are driven using single-ended RF signals.

SUMMARY OF THE INVENTION

Disclosed herein is a radio frequency front-end (RFFE) architecture for sounding reference signal (SRS) antenna switching using a first power amplifier module (PAM) and a remote module to control local and remote antennas. The modules include various transmit and receive signal paths, power amplifiers and low-noise amplifiers, filters for signal conditioning, and switch blocks comprising a plurality of switches for selectively routing the signal paths. In certain embodiments, external bypass ports may be included to increase the connectivity of the modules and provide for additional operating modes of the front-end (FE). The FE SRS architecture advantageously reduces insertion losses (including switching losses), reduces component count and the number of external connections to the FE, and can provide improved isolation performance in a compact package.

In one aspect, a radio frequency front-end system can include a first radio frequency module including a first plurality of switches, a first power amplifier, and a first transmit terminal configured to receive a first radio frequency transmit signal, a first signal trace and a second signal trace, and a second radio frequency module including a second plurality of switches and a second power amplifier, the first plurality of switches and the second plurality switches operable in a plurality of modes including a first mode in which the first power amplifier is bypassed and the first radio frequency transmit signal is provided to an input of the second power amplifier over the first signal trace, and a second mode in which the first power amplifier amplifies the first radio frequency transmit signal and provides a first amplified radio frequency transmit signal to the second radio frequency module over the second signal trace.

In some embodiments, the first radio frequency module further includes a first antenna terminal and a second antenna terminal, and the second radio frequency module further includes a third antenna terminal and a fourth antenna terminal. According to a number of embodiments, the plurality of modes further includes a third mode in which a first radio receive signal received from the third antenna terminal is provided to the first radio frequency module over the first signal trace. In accordance with several embodiments, the plurality of modes further includes a fourth mode in which a second radio receive signal received from the fourth antenna terminal is provided to the first radio frequency module over the second signal trace. According to various embodiments, an output of the first power amplifier is connectable to any of the first antenna terminal, the second antenna terminal, the third antenna terminal, or the fourth antenna terminal. In accordance with a number of embodiments, an output of the second power amplifier is connectable to any of the first antenna terminal, the second antenna terminal, the third antenna terminal, or the fourth antenna terminal.

In several embodiments, the plurality of modes further includes a third mode in which an output of the second power amplifier is connected to the first radio frequency module over the second signal trace.

In various embodiments, the first radio frequency transmit signal has a frequency in a range of 3 gigahertz to 7.125 gigahertz.

In some embodiments, an output of the second radio frequency module is bypassed to facilitate cross-module connection between the first radio frequency module and the second radio frequency module. According to a number of embodiments, the output of the second radio frequency module is connected to an input of the first radio frequency module by the first signal trace or the second signal trace.

In another aspect, a mobile device can include a transceiver configured to generate a first radio frequency transmit signal, and a front-end system coupled to the transceiver, the front-end system including a first signal trace, a second signal trace, a first radio frequency module including a first plurality of switches, a first power amplifier, and a first transmit terminal configured to receive a first radio frequency transmit signal, the front-end system further including a second plurality of switches and a second power amplifier, the first plurality of switches and the second plurality switches operable in a plurality of modes including a first mode in which the first power amplifier is bypassed and the first radio frequency transmit signal is provided to an input of the second power amplifier over the first signal trace, and a second mode in which the first power amplifier amplifies the first radio frequency transmit signal and provides a first amplified radio frequency transmit signal to the second radio frequency module over the second signal trace.

In some embodiments, the mobile device further includes a first antenna, a second antenna, a third antenna, and a fourth antenna. According to a number of embodiments, the plurality of modes further includes a third mode in which a first radio receive signal received from the third antenna is provided to the first radio frequency module over the first signal trace. In accordance with several embodiments, the plurality of modes further includes a fourth mode in which a second radio receive signal received from the fourth antenna is provided to the first radio frequency module over the second signal trace.

In a number of embodiments, the first radio frequency transmit signal has a frequency in a range of 3 gigahertz to 7.125 gigahertz.

In various embodiments, the first radio frequency module includes a band-pass filter coupled to the second plurality of switches and having a passband corresponding to the n78 frequency band.

In several embodiments, the first radio frequency module includes a band-pass filter coupled to the second plurality of switches and having a passband corresponding to the n77 or n79 frequency band.

In some embodiments, an output of the second radio frequency module is bypassed to facilitate cross-module connection between the first radio frequency module and the second radio frequency module. According to a number of embodiments, the output of the second radio frequency module is connected to an input of the first radio frequency module by the first signal trace or the second signal trace.

In yet another aspect, a method of front-end operation in a mobile device comprises: receiving a first radio frequency transmit signal as an input to a first radio frequency module of a front-end system, the first radio frequency module coupled to a second radio frequency module over a first signal trace and a second signal trace, controlling a first plurality of switches of the first radio frequency module and a second plurality of switches of the second radio frequency module to set the front-end system in an operating mode chosen from a plurality of modes including a first mode and a second mode, operating the front-end system in the first mode, including bypassing a first power amplifier of the first radio frequency module, and providing the first radio frequency transmit signal to an input of a second power amplifier of the second radio frequency module over the first signal trace, and operating the front-end system in the second mode, including amplifying the first radio frequency transmit signal using the first power amplifier and providing a first amplified radio frequency transmit signal to the second radio frequency module over the second signal trace.

In various embodiments, the plurality of modes further includes a third mode in which a first radio receive signal received from a third antenna is provided to the first radio frequency module over the first signal trace. According to several embodiments, the plurality of modes further includes a fourth mode in which a second radio receive signal received from a fourth antenna is provided to the first radio frequency module over the second signal trace.

In accordance with a number of embodiments, the first radio frequency transmit signal has a frequency in a range of 3 gigahertz to 7.125 gigahertz.

Any of the features, components, or details of any of the arrangements or embodiments disclosed in this application, including without limitation any of the apparatus embodiments and any of the radio frequency embodiments disclosed herein, are interchangeably combinable with any other features, components, or details of any of the arrangements or embodiments disclosed herein to form new arrangements and embodiments.

DETAILED DESCRIPTION OF THE PREFERRED EMBODIMENT

Figure 1:
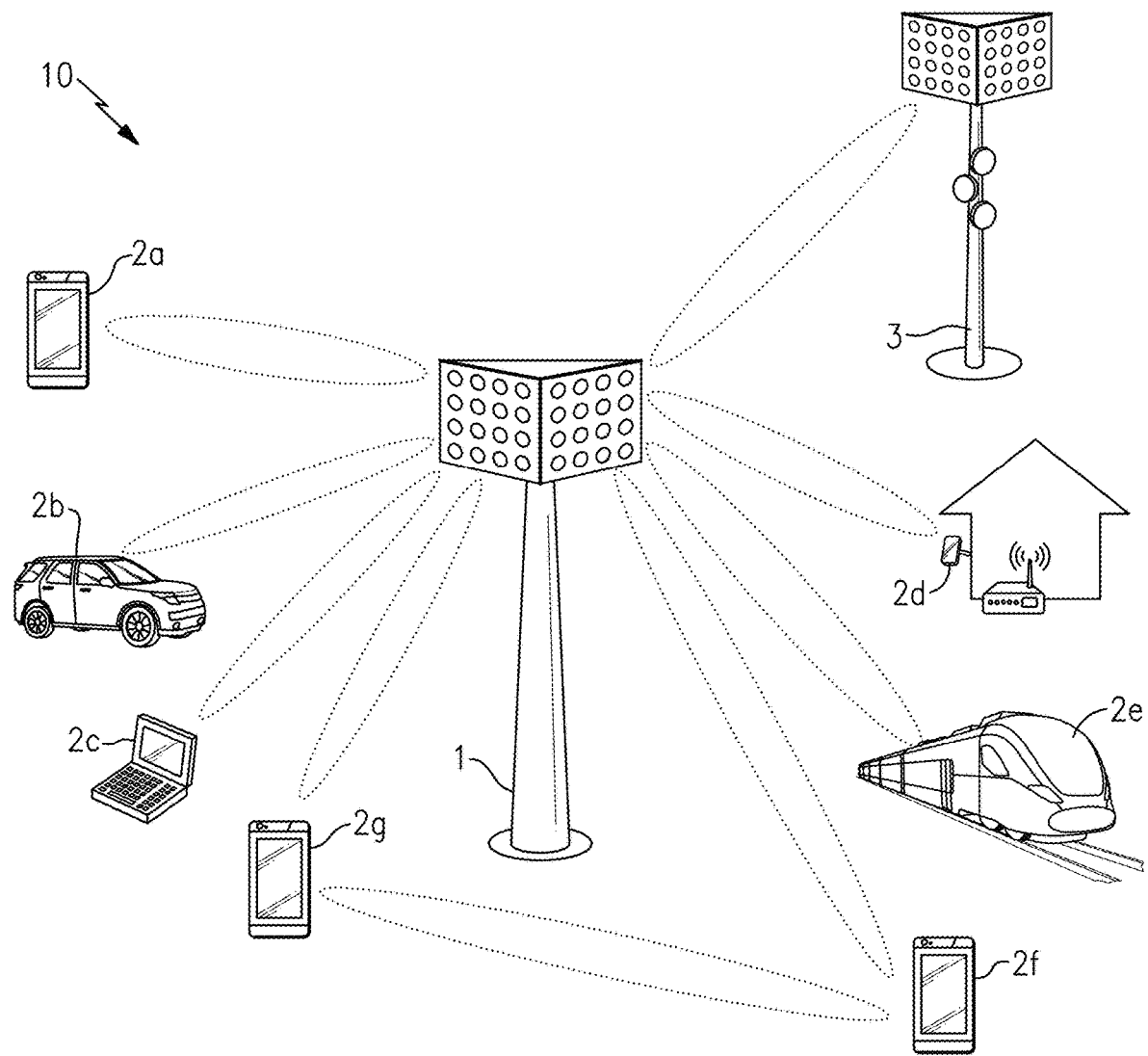
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IoT), Vehicle-to-Everything (V2X), and High Power User Equipment (HPUE).

3GPP introduced Phase 1 of fifth generation (5G) technology in Release 15, and introduced Phase 2 of 5G technology in Release 16. Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

Example RF Communications Systems, Networks and Features

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul (for instance, as between mobile device 2g and mobile device 2f).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1) in the range of about 400 MHz to about 7.125 GHZ, Frequency Range 2 (FR2) in the range of about 24.250 GHz to about 71.000 GHz (including FR2-1 spanning 24 GHz to 52 GHz and/or FR2-2 spanning 52 GHz to 71 GHz), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
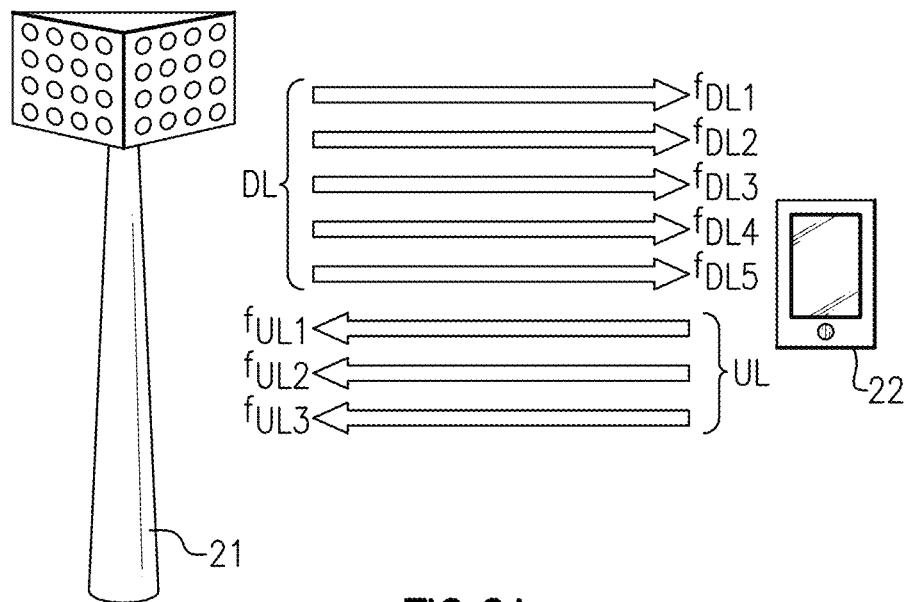
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
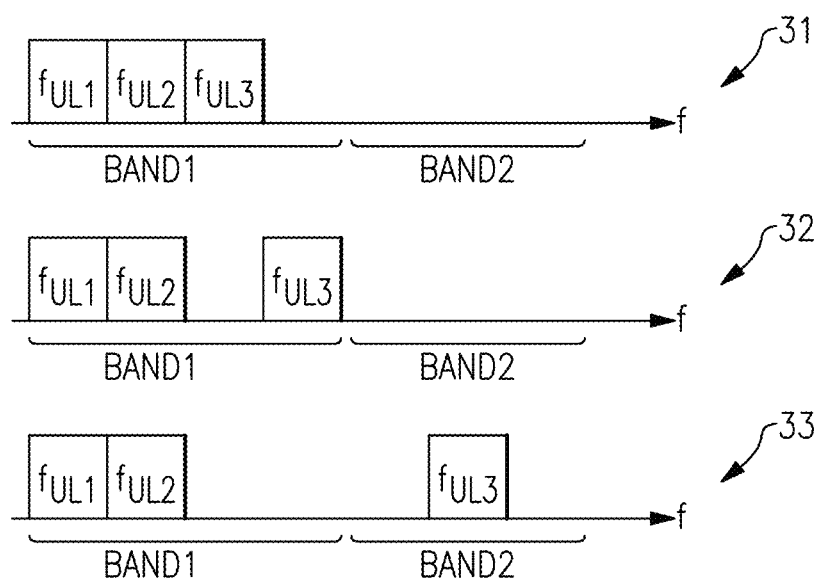
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier $f_{UL1}$, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL2}$ of a first frequency band BAND1 with component carrier $f_{UL3}$ of a second frequency band BAND2.

Figure 2C:
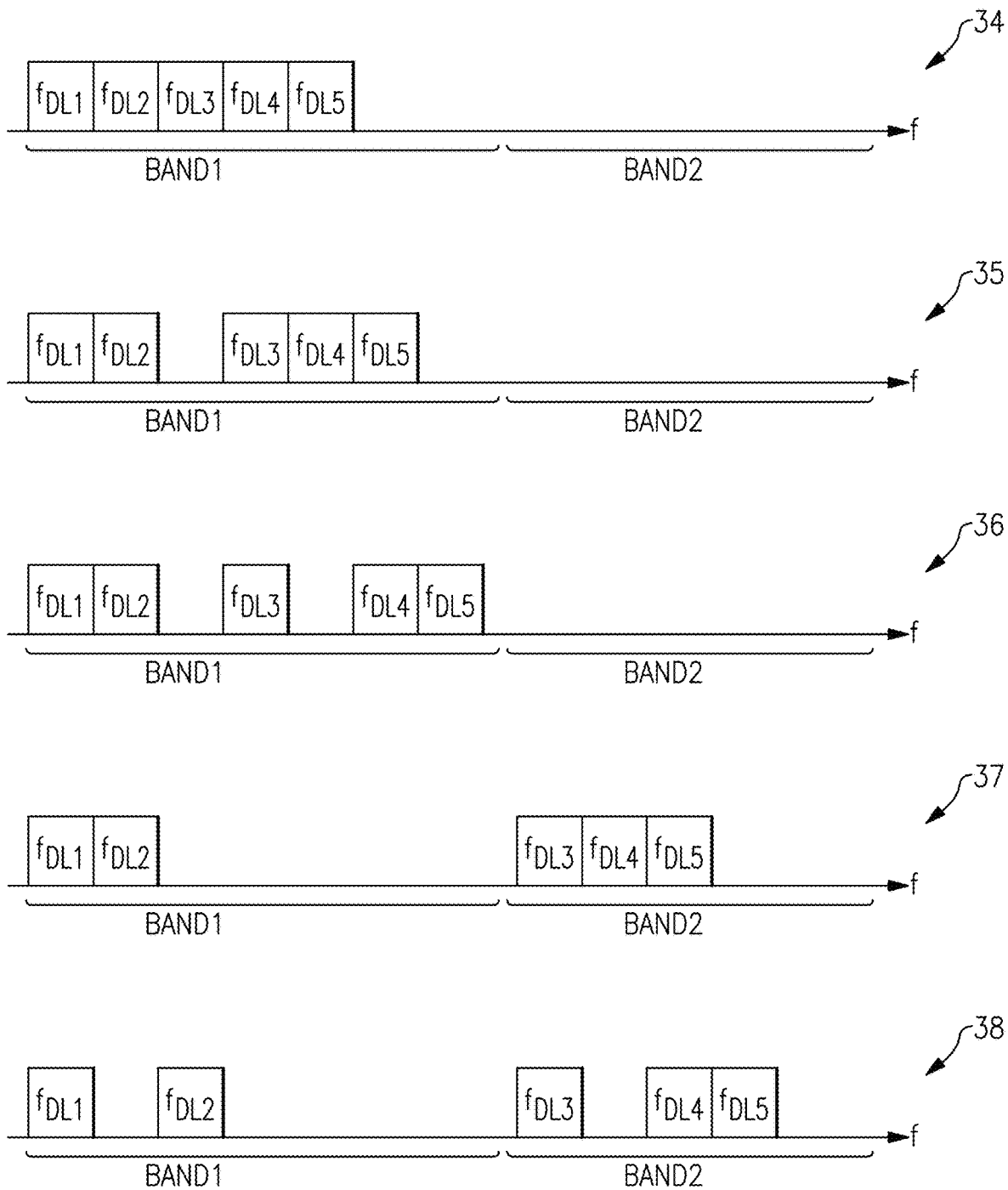
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and secondary cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink. Furthermore, NR-U can operate on top of LAA/eLAA over a 5 GHz band (5150 to 5925 MHZ) and/or a 6 GHz band (5925 MHz to 7125 MHz).

Figure 3A:
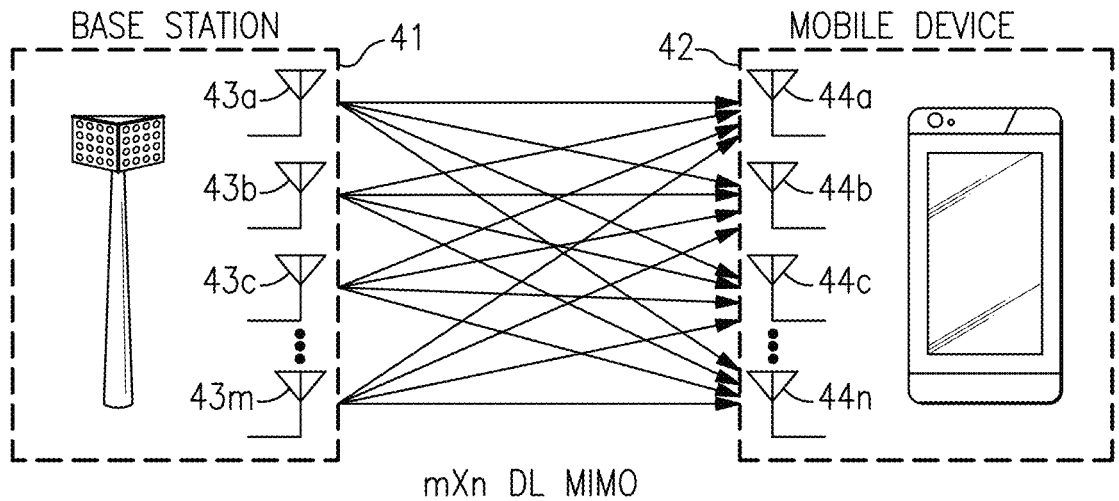
FIG. 3A is a schematic diagram of one example of a downlink channel using multi-input and multi-output (MIMO) communications.
Figure 3B:
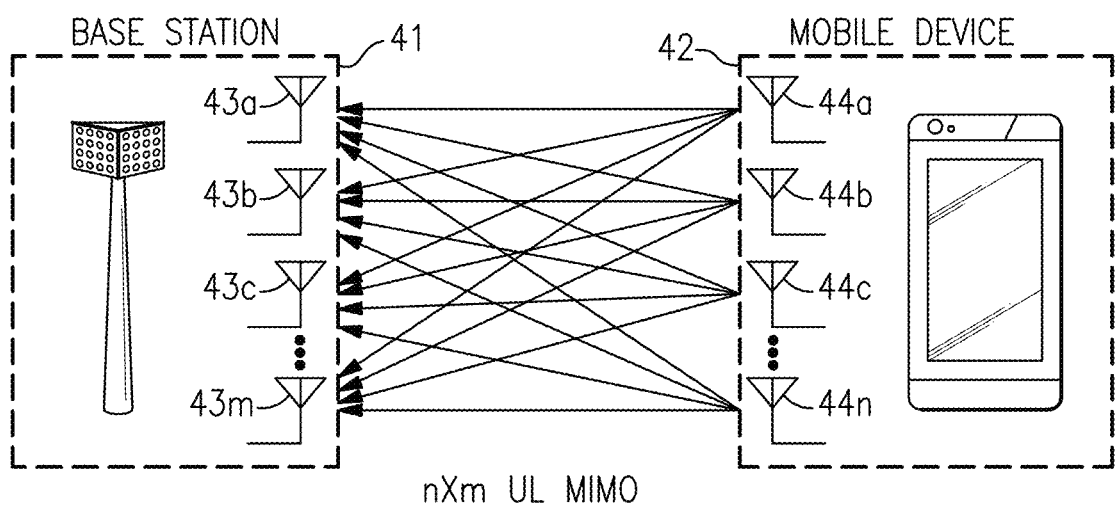
FIG. 3B is a schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas 43a, 43b, 43c, . . . 43m of the base station 41 and receiving using N antennas 44a, 44b, 44c, . . . 44n of the mobile device 42. Accordingly, FIG. 3A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas 44a, 44b, 44c, . . . 44n of the mobile device 42 and receiving using M antennas 43a, 43b, 43c, . . . 43m of the base station 41. Accordingly, FIG. 3B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3C:
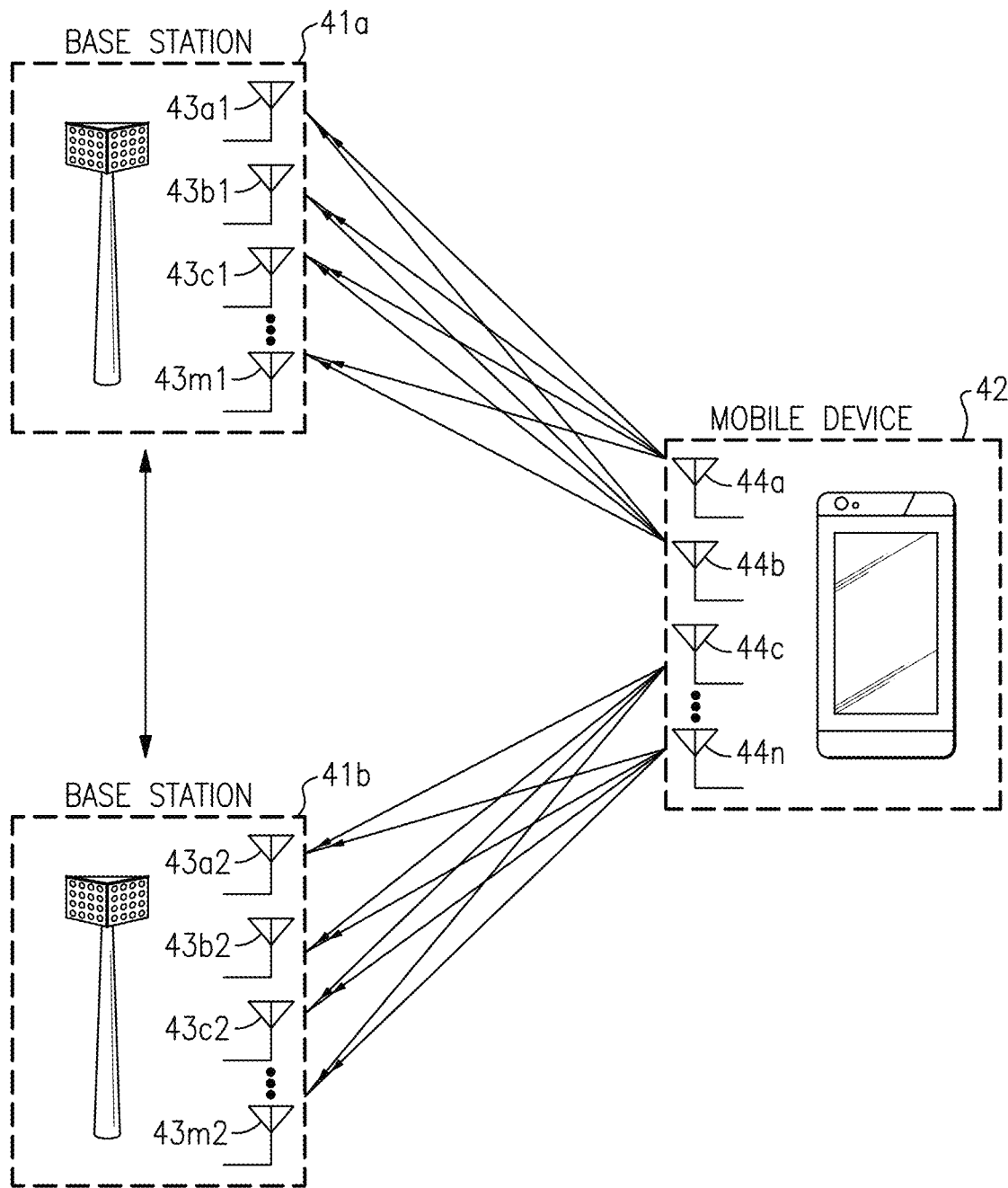
FIG. 3C is a schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas 44a, 44b, 44c, . . . 44n of the mobile device 42. Additionally, a first portion of the uplink transmissions are received using M antennas 43a1, 43b1, 43c1, . . . 43m1 of a first base station 41a, while a second portion of the uplink transmissions are received using M antennas 43a2, 43b2, 43c2, . . . 43m2 of a second base station 41b. Additionally, the first base station 41a and the second base station 41b communication with one another over wired, optical, and/or wireless links.

The MIMO scenario of FIG. 3C illustrates an example in which multiple base stations cooperate to facilitate MIMO communications.

RF Front-End Architectures

Features in 5G, such as sounding reference signal (SRS) antenna port switching can necessitate additional connectivity of the transmitter (or the transceiver) to available downlink capable antennas in UE. Thus, even though such antennas are used for downlink (receiving signals) for regular UE communications, such feature support necessitates access of the UE's transmitter to the antennas.

Moreover, the geographical positioning of the RF modules within the UE (for example, to place an RF module close to a particular antenna) can result in certain RF modules being far from the transceiver and/or other RF modules. The cable connections and routes between the transmitter and remote antennas and/or other RF modules can often result in losses that degrade performance, raise coupling/isolation challenges, and/or introduce expensive cross-UE cables and corresponding connections. Furthermore, such connection overhead can result in significant loss arising from both the cabling itself as well as from multiple cascaded series switches included to provide appropriate connectivity.

RF front-end systems for supporting antenna switching and swap are provided herein. In certain embodiments, an RF front-end system for UE includes a first RF module including a first plurality of switches, a first power amplifier, and a first transmit terminal that receives a first RF transmit signal. The RF front-end system further includes a second RF module including a second plurality of switches and a second power amplifier. The first plurality of switches and the second plurality switches are operable in multiple modes including a first mode in which the first power amplifier is bypassed and the first RF transmit signal is provided to an input of the second power amplifier over a first signal trace, and a second mode in which the first power amplifier amplifies the first RF transmit signal and provides a first amplified RF transmit signal to the second RF module over a second signal trace.

By implementing the RF front-end system in this manner, a number of features are supported, including those associated with SRS, MIMO, and/or antenna swap. Moreover, the first signal trace and the second signal trace can be reused for multiple functions to reduce cable count for both transmit and receive (which are non-concurrent for TDD).

Figure 4:
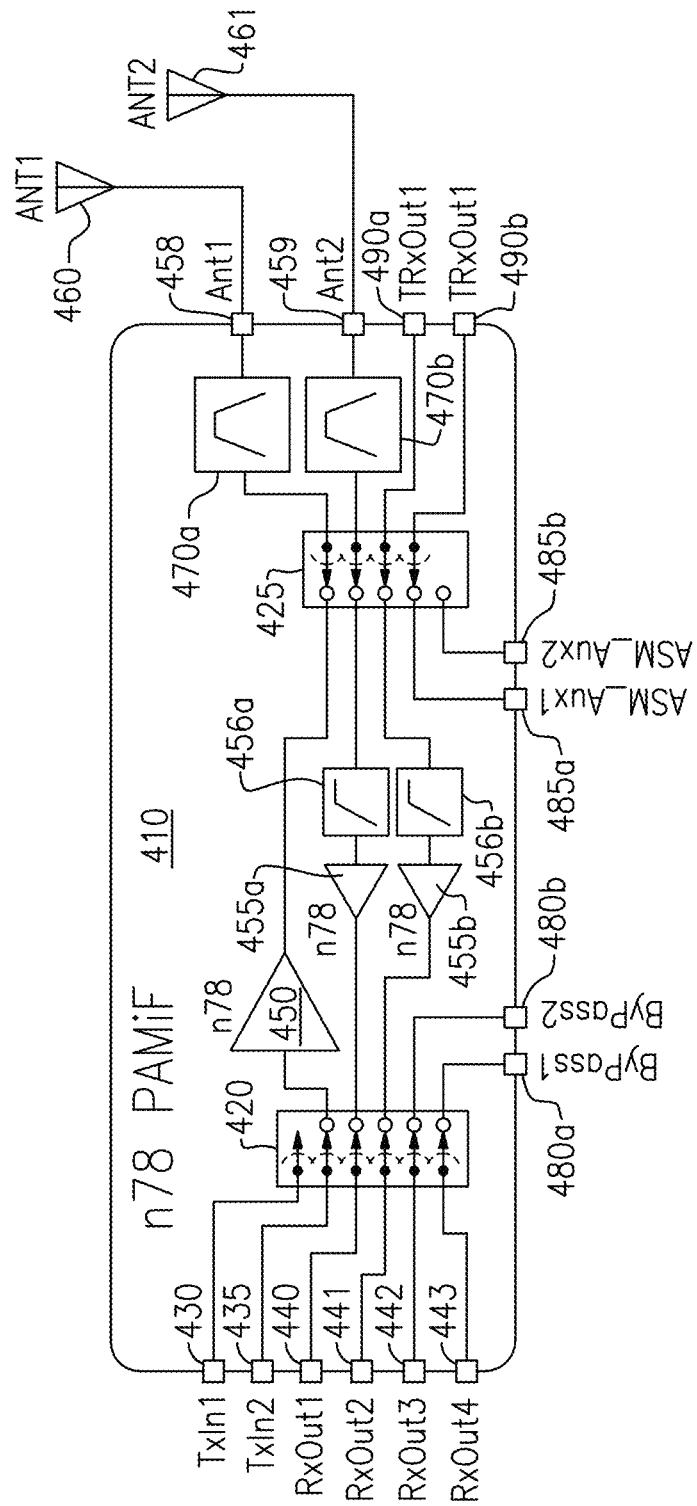
FIG. 4 is a schematic diagram of an embodiment of a radio frequency (RF) module.

FIG. 4 illustrates an RF module 410 for use in a communications system according to any of the previous figures. In FIG. 4, the RF module 410 is a power amplifier module with integrated filters (hereafter referred to as "power amplifier module", "PAM", or "PAMiF") configured to operate at ultra-high band (UHB) frequencies, including the n78 band of 5G, in this embodiment. The RF module 410 is one component of an RF front-end system for antenna switching, supporting for instance sounding reference signal (SRS) switching and antenna swap, within a larger communications system such as UE. The RF module 410 is coupled to a first antenna (ANT1) 460 and a second antenna (ANT2) 461.

In the illustrated embodiment, the power amplifier module 410 includes a first switch block 420 (also referred to herein as switches 420) and a second switch block 425 (also referred to herein as switches 425), each comprising a plurality of switches for selectively switching various RF signal paths within the module, as well as for routing into or out of the module. In the preferred embodiment, each switch block 420/425 includes at least four pairs of input and output ports to route four RF signal paths simultaneously. The power amplifier module 410 can be configured with additional signal paths (such as additional transmit or receive channels) by using larger switch blocks 420/425 with additional ports (input ports, output ports, and/or port pairs), by multiplexing the RF signals, or by any other technique known to one skilled in the art.

Electrically connected to the first switch block 420, the power amplifier module 410 includes a pair of transmit ports TxIn1/TxIn2 (transmit ports 430/435) and a plurality of receive ports RxOut1 440/RxOut2 441/RxOut3 442/RxOut4 443 (receive ports 440-443). A transmit path connects one of the transmit ports TxIn1 430/TxIn2 435 to a first antenna terminal 458 (coupled to the first antenna 460), a second antenna terminal 459 (coupled to the second antenna 461), a first auxiliary port (ASM_Aux1) 485a, or a second auxiliary port (ASM_Aux2) 485b, by way of an RF power amplifier 450, which in this example operates at frequencies in the n78 band. However, other frequencies, such as those in FR1 or FR2 of 5G, are possible. In certain implementations, the operational range of the power amplifier module 410 can include the n77 and/or n79 frequency bands. In other implementations, the power amplifier can include two or more transmit paths each connected to one of the transmit ports 430/435.

The power amplifier module 410 also includes one or more receive paths for connecting one of the receive ports 440-443 to the first antenna 460, to the second antenna 461, to a first bypass terminal 480a (Bypass1), or a second bypass terminal 480b (Bypass 2). Preferably, the power amplifier module 410 includes a pair of receive paths for connecting two of the four receive ports to the antennas 460/461. Each receive path includes an amplifier such as a low-noise RF amplifier 455a/455b (LNA), and a receive path RF filter 456a/456b (such as a high-pass or band-pass filter) for signal conditioning and filtering. In certain embodiments, the receive path LNAs 455a/455b can operate over substantially the same frequency range as the transmit path RF power amplifier 450. In other embodiments, the receive path LNAs 455a/455b can be configured to operate at a different frequency or in a different frequency bands from the transmit path RF power amplifier 450 to facilitate duplex operation of the power amplifier module 410.

In addition to the receive RF filters 456a/456b, a pair of antenna RF filters 470a/470b is present in the power amplifier module 410. Each of the antenna RF filters 470a/470b is connected to a selected transmit or receive path and a corresponding one of the antennas 460/461 via the antenna terminals 458/459. The antenna RF filters 470a/470b are preferably band-pass filters having a passband substantially within a particular frequency band or bands (for example, the n78 frequency band), but the design of the RF filters and their implementation can also depend on various characteristics of the antennas 460/461 such as bandwidth, gain, directivity, polarization, effective length, or any other characteristic known to one skilled in the art. As will be discussed herein, the first antenna 460 and second antenna 461 do not necessarily operate at the same frequency or within the same frequency band, and the antenna RF filters 470a/470b can each be configured for signal conditioning and filtering in the signal path of the antennas 460/461.

A pair of bypass paths within the power amplifier module 410 internally connect a selected transmit or receive port to a desired bypass terminal. As will be discussed herein, the bypass terminals 480a/4780b allow RF signals to be routed external to the PAM 410 elsewhere within a front-end (FE) by one or more external signal traces (for example, 475a/475b in FIG. 5), such as to a transmit port of a second PAM operating in parallel. The first switch block 420 can selectively connect two of the receive ports 440-443 to the bypass terminals, while the second switch block 425 can selectively connect a pair of auxiliary terminals 485a/485b to a pair of transmit path output ports 490a/490b. If desired, the bypass terminals 480a/480b can be connected directly to the auxiliary terminals 485 for a "pass-through" configuration that routes RF signals to a remote PAM via the transmit path output ports 490a/490b.

Figure 5:
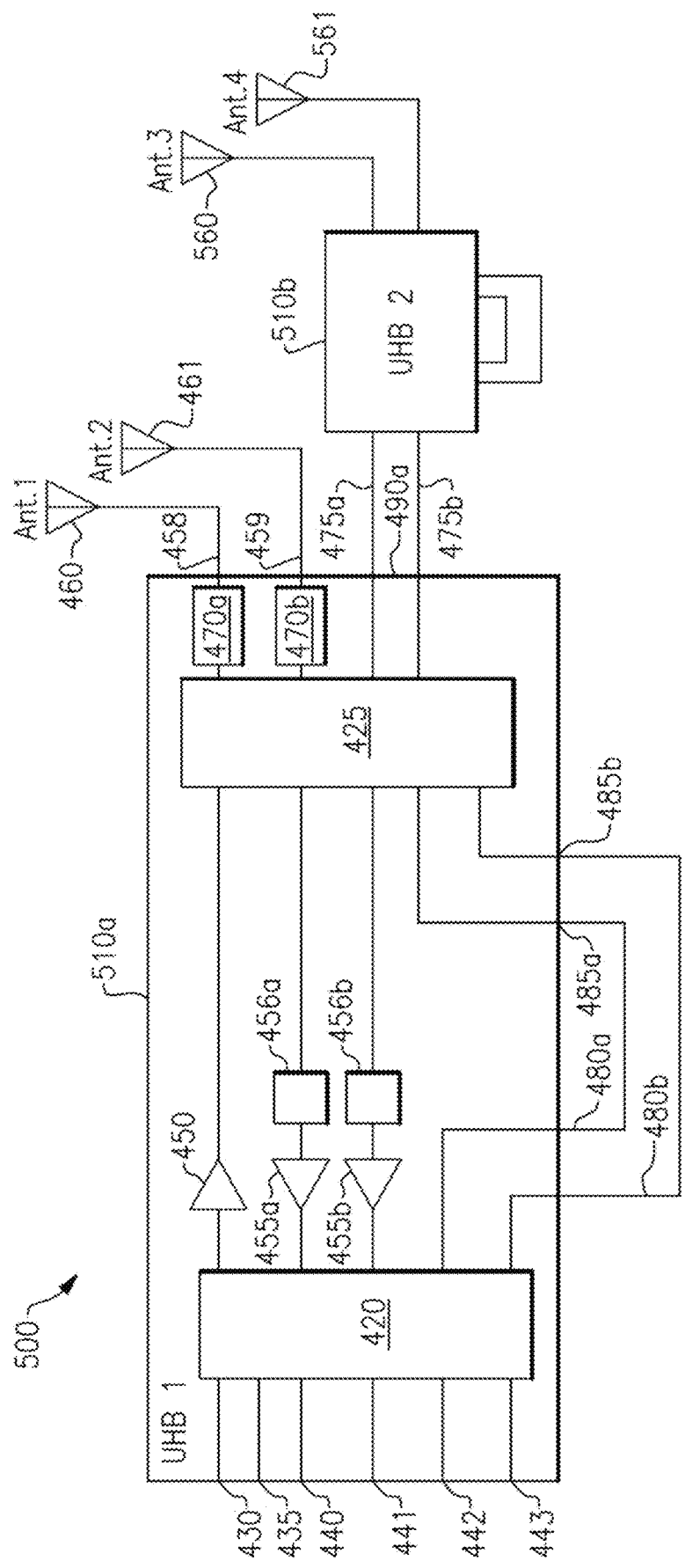
FIG. 5 is a schematic diagram of an embodiment of an RF front-end system.

FIG. 5 is a schematic diagram of an embodiment of an RF front-end system 500. The RF front-end system 500 includes a first RF module 510a (which can be implemented in accordance with the RF module 410 of FIG. 4), a second RF module 510b (which can also be implemented in according with the RF module 410 of FIG. 4), a first signal trace 475a, and a second signal trace 475b. Connection to a first antenna 460, a second antenna 461, a third antenna 560, and a fourth antenna 561 is shown.

Figure 6:
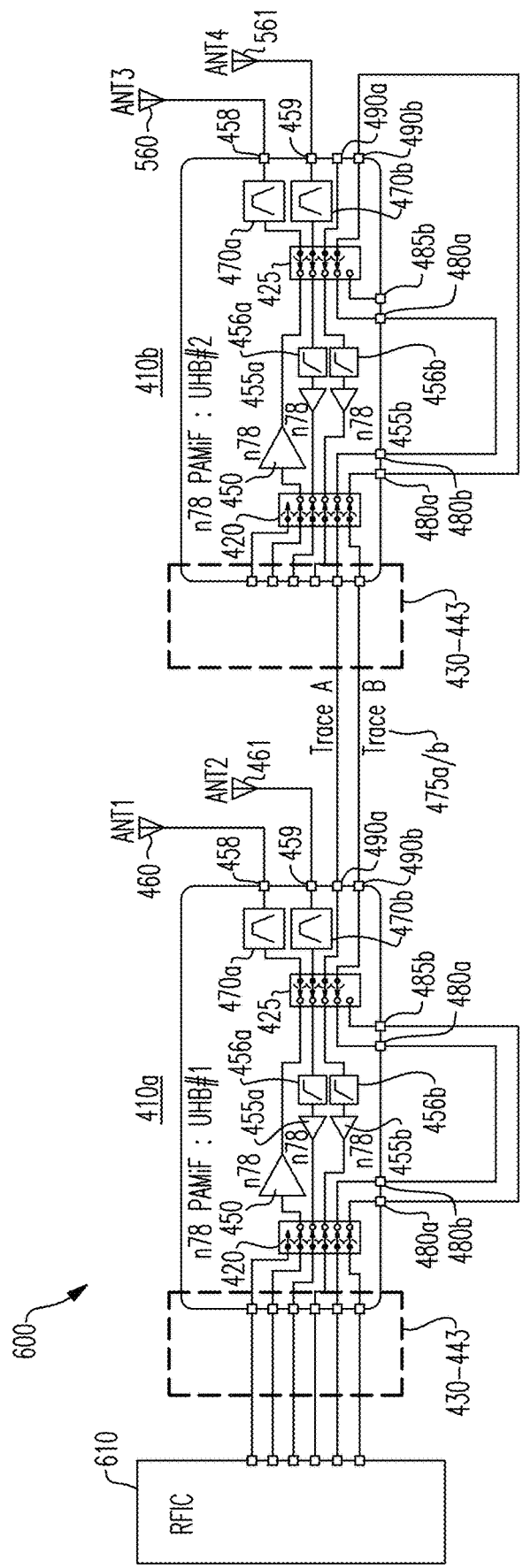
FIG. 6 is a schematic diagram of another embodiment of an RF front-end system.

FIG. 6 is a schematic diagram of another embodiment of an RF front-end system 600. In comparison to the RF front-end system 500 of FIG. 5, connection to a transceiver (RFIC) 610 is depicted and both RF modules 410a/410b are implemented using the embodiment of FIG. 4.

With reference to the embodiments of FIG. 5 and FIG. 6, in certain implementations a first ultra-high band (UHB) power amplifier module 410a/510a is included, and a second UHB PAM is provided as a remote module 410b/510b for driving a remote pair of transmit and receive antennas 560/561. (For ease of illustration, the remote module 510b is shown as a simplified block in FIG. 5). The remote module 410b can be located at a considerable physical distance from the PAM 410a/510a to reduce or prevent crosstalk in the RF front-end system 500/600. Advantageously, the front-end architecture of the illustrated embodiments reduces the number of connections required between the PAM 410a/510a and the remote module 410b/510b. In the preferred embodiment, the number of cross-UE and cross-module connections, including external signal traces 475a/475b, is no more than the number of remote antennas 560/561.

The UHB power amplifier modules 410a/410b are preferably configured to transmit and receive RF signals in the n78 frequency band. The receive path RF filters 456a/456b and antenna RF filters 470a/470b are provided for signal conditioning and filtering to selectively acquire signals within the desired frequency range. In certain embodiments (such as for duplex operation of the RF front-end system 500/600), the antennas 460 and 461 (and/or antennas 560 and 561) may be configured for operation at different frequencies or in different frequency bands. In other embodiments, the remote module 410b may be configured for operation at different frequencies or in different frequency bands from the PAM 410a.

In the embodiments of FIG. 5 and FIG. 6, the first switch block 420 of the PAM 410a can selectively connect the transmit ports 430/435 to the bypass terminals 480a/480b or to the power amplifier 450 via the transmit path. Likewise, the first switch block 420 can selectively connect the receive ports 440-443 to the bypass terminals 480a/480b or to either of the receive path LNAs 455a/455b via the receive paths. If a bypass connection exists, transmit and receive paths routed through the external bypass terminals 480a/480b re-enter the PAM 410a at the auxiliary terminals 485a/485b, and can be selectively connected to either the transmit and receive antenna terminals 458/459, or to the remote module 411b via the transmit path output ports 490a/490b and second switch block 425.

Advantageously, the external bypass connection created between the bypass terminals 480a/480b and auxiliary terminals 485a/486b results in a pass-through configuration to connect the PAM transmit and receive ports 430, 435, and 440-443 directly to the remote module 410b. This configuration allows full control of the first antennas 460/461 and the remote antennas 560/561 through the ports of the PAM 410a, simplifying the design and connectivity of the RF front-end system 500/600. Because amplification of the RF signals can occur in the remote module 410b, interference in the rest of the RF front-end system 500/600 or elsewhere in the communications system is reduced. In the preferred embodiment, each of the transmit ports 430/435 and receive ports 440-443 is externally connected to a corresponding port of a radio frequency integrated circuit (RFIC) 610 (also referred to herein as a transceiver). In certain embodiments, the transmit ports 430/435 and receive ports 440-443 may be routed to separate RFICs elsewhere in the communications system.

As shown in FIG. 6, the remote module 410b can also have an external connection between a transmit path output port 490b and a bypass terminal 480a to facilitate cross-module connection between the PAM 410a and remote module 410b. The bypass terminals 480 offer additional connectivity options for the RF paths, such as matching networks, additional filtering, or signal insertion, and provide greater flexibility for a UE designer to utilize all available ports.

Based on the configuration of the switch blocks 420/425, the RF front-end system 500 can operate in various operating modes. In a first mode, the RF power amplifier 450 is bypassed and a first RF transmit signal is provided to the transmit port 430/435 of the remote module 410b over the first signal trace 475a. In a second mode, the RF power amplifier 450 amplifies the first RF transmit signal and provides a first amplified RF transmit signal to the remote module 410b over the second signal trace 475b.

Additionally, the RF front-end system 500 can operate in a third mode in which a first radio receive signal received from the remote antenna 560/561 via the remote antenna port 458/459 is provided to the PAM 410a over the first signal trace 475a. In a fourth operating mode, a second radio receive signal received from the remote antenna 560/561 via the remote antenna port 458/459 is provided to the PAM 410a over the second signal trace 475b.

Accordingly, the FE systems herein can provide a number of benefits.

In a first example, Tx2 input drive power to the remote PA input is provided.

In a second example, return routes for Tx2 PA output power back to the near-side Ant1 and Ant2 are provided. By sharing all of these signals the same number of routes as the minimum (number of antennas) the architecture enables lower insertion loss, elimination of external components, lower cost/area, and/or improved isolation.

In a third example, Rx3 output for support of the PA drive input connectivity is provided.

In a fourth example, Rx4 output for support of the return routes of max power Tx2 to reach Ant1/Ant2 for SRS antenna port switching support, as well as the Rx connections for 4×4 DL MIMO, are provided.

Figure 7:
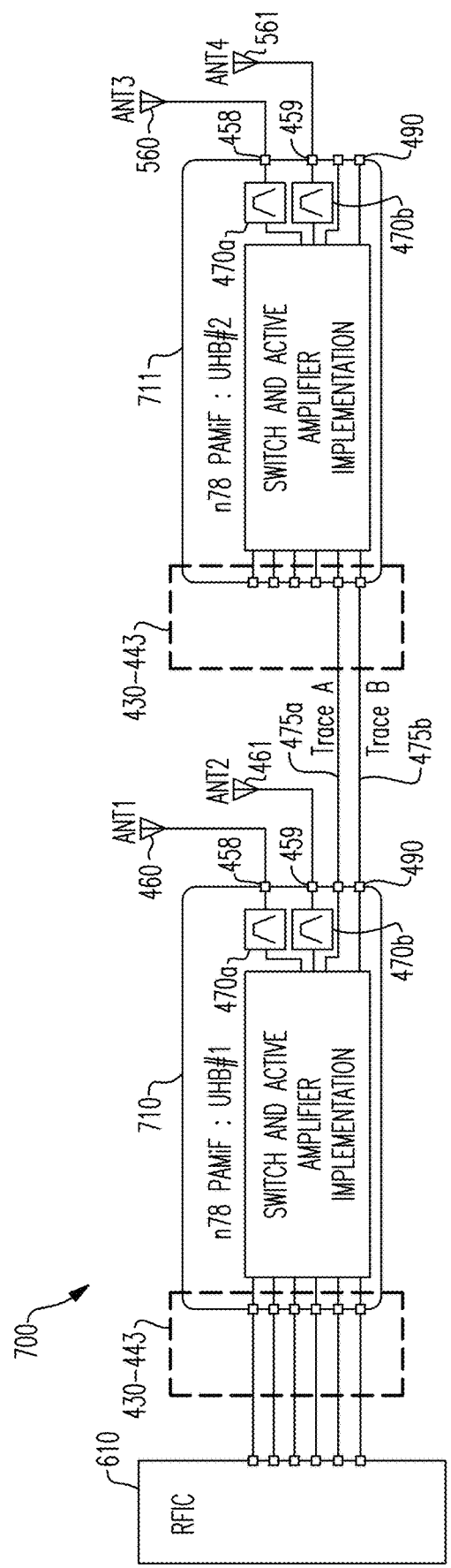
FIG. 7 is a schematic diagram of another embodiment of an RF front-end system.

FIG. 7 is a schematic diagram of another embodiment of an RF front-end system 700. The RF front-end system 700 includes a first RF power amplifier module (PAM) 710 and a second RF power amplifier module (remote PAM) 711 connected by a first signal trace 475a and a second signal trace 475b. Connections to a transceiver 610, a first antenna 460a, a second antenna 461, a third antenna 560, and a fourth antenna 561 are depicted.

Figure 8:
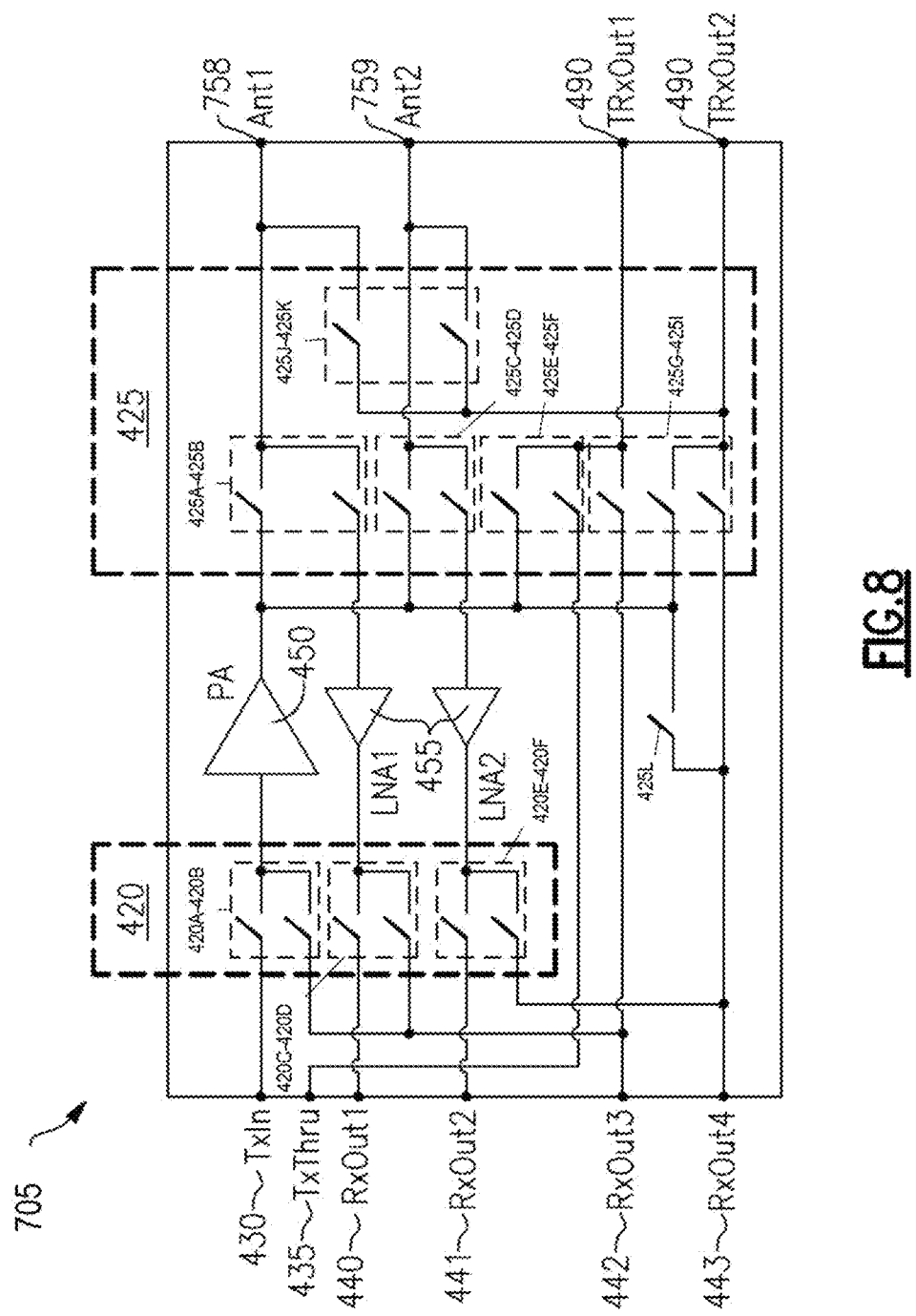
FIG. 8 is a schematic diagram of another embodiment of a portion of an RF module.

FIG. 8 is a schematic diagram of another embodiment of a portion of an RF module 705 that can be incorporated into an RF module of a front-end system (for example, either of the RF modules of FIG. 7).

Referring now to FIG. 7 and FIG. 8, a simplified architecture for a front-end system 700 is shown by the RF module 705. (For ease of illustration, FIG. 8 is a schematic diagram of the internal structure of a PAM 710 or a remote PAM 711 of FIG. 7.) In this embodiment, the external bypass connections can be omitted entirely, and the bypass terminals remain disconnected or absent from the design of each power amplifier module 710/711. One of the transmit ports 430/435 is configured as a pass-through to the second switch block 425 and a transmit path output ports 490, avoiding additional switching losses in the transmit path caused by the first switch block 420.

The architecture of FIG. 7 further improves the performance of the front-end system 700 by reducing the number of switches required in the switch blocks 420/425 and eliminates insertion losses caused by the series cascade of the first and second switch blocks. Insertion losses are further reduced because each RF path experiences only single series switching loss. Eliminating the external bypass connections and bypass ports (i.e., bypass terminals 480a/480b) reduces the overall pin requirements for the front-end system 700. More generally, embodiments of the FE architecture of the present invention offers improved isolation, lower insertion losses (including switching losses), reduced or eliminated external components, and a smaller, cost-effective package.

FIG. 8 illustrates the internal structure of the simplified PAM 710 and remote PAM 711 with a reduced component count and surface area. The antenna filters 470 can be integrated within the PAM 710, as in FIG. 7, or connected externally via the antenna terminals 458/459. In the simplified embodiment of FIG. 8, the receive path RF filters 456 can be omitted to further reduce the component count, or can be connected external to the PAM 710 via the receive ports 440-443.

In FIG. 8, the first switch block 420 includes switch 420A (between TxIn and the input of PA 450), switch 420B (between RxOut3 and the input of PA 450), switch 420C (between RxOut1 and the output of LNA1), switch 420D (between RxOut3 and the output of LNA1), switch 420E (between RxOut2 and the output of LNA2), and switch 420F (between RxOut4 and the output of LNA2). The second switch block 425 includes switch 425A (between the output of PA 450 and Ant1), switch 425B (between the input of LNA1 and Ant1), switch 425C (between the output of PA 450 and Ant2), switch 425D (between the input of LNA2 and Ant2), switch 425E (between the output of PA 450 and TRxOut1), switch 425F (between TxThru and TRxOut1), switch 425G (between RxOut3 and TRxOut1), switch 425H (between the output of PA 450 and TRxOut2), switch 425I (between RxOut4 and TRxOut2), switch 425J (between Ant1 and TRxOut2), switch 425K (between Ant2 and TRxOut2), and switch 425L (between the output of PA 450 and RxOut4). Switches 420A, 420B, 420C, 420D, 420E, and 420F are collectively referred to as switches 420A-420F, while switches 425A, 425B, 425C, 425D, 425E, 425F, 425G, 425H, 425I, 425J, 425K, and 425L are collectively referred to as switches 425A-425L. The individual switches can be subdivided into pairs according to the signal traces to which they connect. For example, the switch 420A and the switch 420B can represent a first switch pair 420A-420B connected to the input of the RF power amplifier 450. The switch 420C and the switch 420D can represent a second switch pair 420C-420D connected to an output of one of the receive path LNAs 455 (LNA1), etc. Certain individual switches, such as an additional pair consisting of the switches 425J and 425K, can each be in series with a respective antenna port 758 or 759 to selectively couple a connected antenna pair to the transmit path output port 490 and/or receive port 443.

Figure 9:
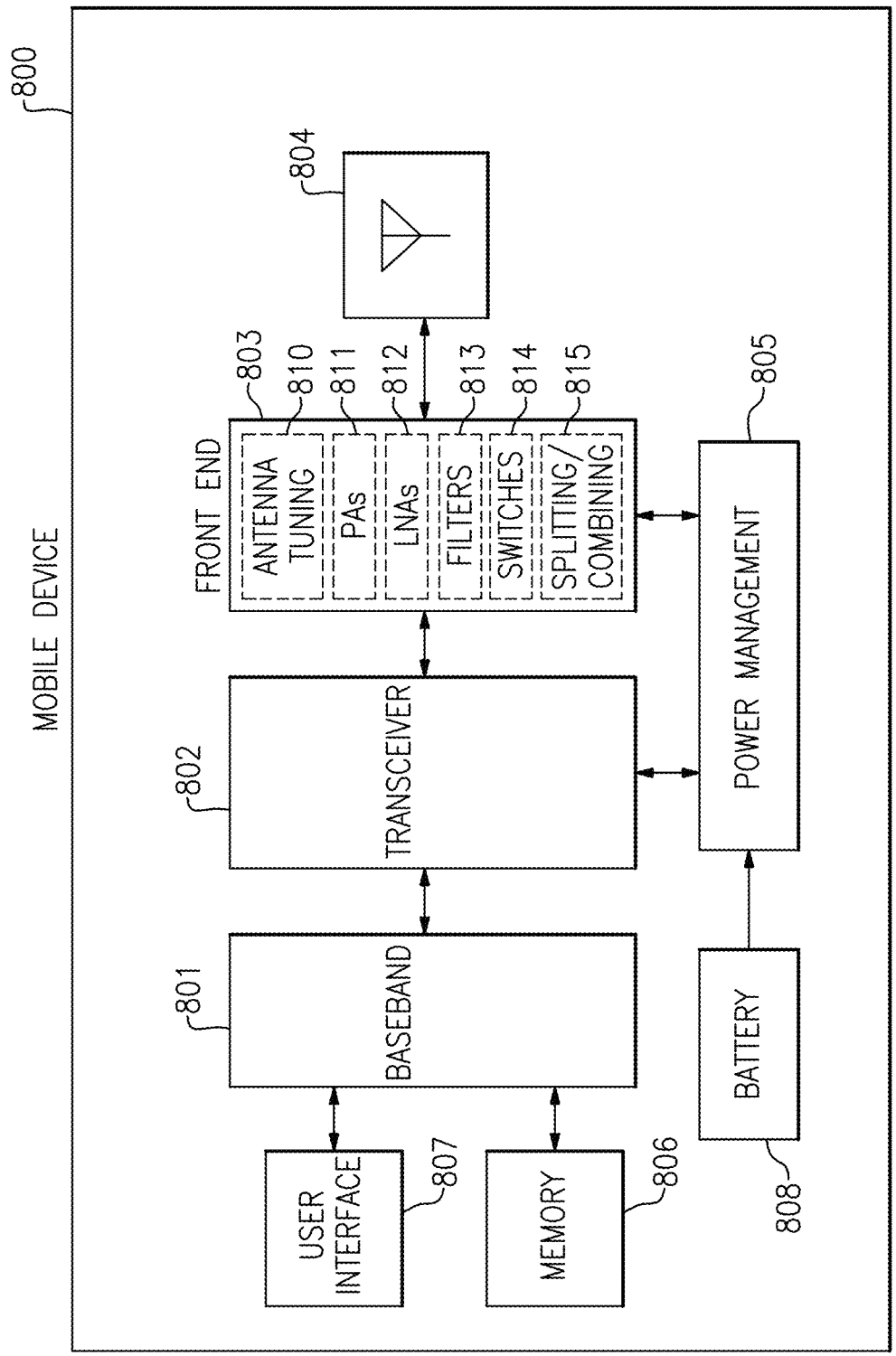
FIG. 9 is a schematic diagram of one embodiment of a mobile phone.

FIG. 9 is a schematic diagram of one embodiment of a mobile device 800. The mobile device 800 includes a baseband system 801, a transceiver 802, a front-end system 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 9 as the transceiver 802. In one example, separate components (for instance, separate circuits or dies) can be provided for handling certain types of RF signals.

The front-end system 803 aids in conditioning signals transmitted to and/or received from the antennas 804. In the illustrated embodiment, and the embodiments of FIGS. 5-7, the front-end system 803 includes antenna tuning circuitry 810, power amplifiers (PAS) 811, low noise amplifiers (LNAs) 812, filters 813, switches 814, and signal splitting/combining circuitry 815. The front-end system 803 can be implemented in accordance with any of the embodiments of FIGS. 5-8.

The front-end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single RF channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front-end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 9, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 9, the power management system 805 receives a battery voltage from the battery 808. The battery 808 can be any suitable battery for use in the mobile device 800, including, for example, a lithium-ion battery.

Applications

Devices employing the above-described schemes can be implemented into various electronic devices and multimedia communication systems. Examples of the electronic devices can include, but are not limited to, consumer electronic products, parts of the consumer electronic products, electronic test equipment, communication infrastructure applications, etc. Further, the electronic device can include unfinished products, including those for communication, industrial, medical, and automotive applications.

CONCLUSION

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

Features, materials, characteristics, or groups described in conjunction with a particular aspect, embodiment, or example are to be understood to be applicable to any other aspect, embodiment or example described herein unless incompatible therewith. All of the features disclosed in this specification (including any accompanying claims, abstract and drawings), and/or all of the steps of any method or process so disclosed, can be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

While certain embodiments have been described, these embodiments have been presented by way of example only, and are not intended to limit the scope of protection. Indeed, the novel methods and systems described herein may be embodied in a variety of other forms. Furthermore, various omissions, substitutions, and changes in the form of the methods and systems described herein may be made. Those skilled in the art will appreciate that in some embodiments, the actual steps taken in the processes illustrated and/or disclosed may differ from those shown in the figures. Depending on the embodiment, certain of the steps described above may be removed, others may be added. For example, the actual steps and/or order of steps taken in the disclosed processes may differ from those shown in the figure. Depending on the embodiment, certain of the steps described above may be removed, others may be added. Furthermore, the features and attributes of the specific embodiments disclosed above may be combined in different ways to form additional embodiments, all of which fall within the scope of the present disclosure.

Conditional language used herein, such as, among others, "can," "could", "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied. Additionally, the words "herein," "above," "below," and words of similar import, when used in this application, refer to this application as a whole and not to any particular portions of this application.

Conjunctive language, such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations.

Although the present disclosure includes certain embodiments, examples and applications, it will be understood by those skilled in the art that the present disclosure extends beyond the specifically disclosed embodiments to other alternative embodiments and/or uses and obvious modifications and equivalents thereof, including embodiments which do not provide all of the features and advantages set forth herein. Accordingly, the scope of the present disclosure is not intended to be limited by the specific disclosures of preferred embodiments herein, and may be defined by claims as presented herein or as presented in the future.

What is claimed is:

1. A radio frequency front-end system comprising:
a first radio frequency module including a first plurality of switches, a first power amplifier, a second plurality of switches, a first bypass terminal connected to the first plurality of switches, a second bypass terminal connected to the second plurality of switches, and a first transmit terminal configured to receive a first radio frequency transmit signal;
a first signal trace, a second signal trace, and a third signal trace, the third signal trace external to the first radio frequency module and connecting the first bypass terminal to the second bypass terminal; and
a second radio frequency module including a third plurality of switches and a second power amplifier, the first radio frequency module and the second radio frequency module operable in a plurality of modes including a first mode in which the first power amplifier is bypassed and the first radio frequency transmit signal is provided to an input of the second power amplifier through the first plurality of switches, over the third signal trace, through the second plurality of switches, over the first signal trace, and through the third plurality of switches, the plurality of modes further including a second mode in which the first power amplifier amplifies the first radio frequency transmit signal and provides a first amplified radio frequency transmit signal to the second radio frequency module through the second plurality of switches, over the second signal trace, and through the third plurality of switches.

2. The radio frequency front-end system of claim 1 wherein the first radio frequency module further includes a first antenna terminal and a second antenna terminal, and the second radio frequency module further includes a third antenna terminal and a fourth antenna terminal.

3. The radio frequency front-end system of claim 2 wherein the plurality of modes further includes a third mode in which a first radio receive signal received from the third antenna terminal is provided to the first radio frequency module over the first signal trace.

4. The radio frequency front-end system of claim 3 wherein the plurality of modes further includes a fourth mode in which a second radio receive signal received from the fourth antenna terminal is provided to the first radio frequency module over the second signal trace.

5. The radio frequency front-end system of claim 2 wherein an output of the first power amplifier is connectable to any of the first antenna terminal, the second antenna terminal, the third antenna terminal, or the fourth antenna terminal.

6. The radio frequency front-end system of claim 2 wherein an output of the second power amplifier is connectable to any of the first antenna terminal, the second antenna terminal, the third antenna terminal, or the fourth antenna terminal.

7. The radio frequency front-end system of claim 1 wherein the plurality of modes further includes a third mode in which an output of the second power amplifier is connected to the first radio frequency module over the second signal trace.

8. The radio frequency front-end system of claim 1 wherein the first radio frequency transmit signal has a frequency in a range of 3 gigahertz to 7.125 gigahertz.

9. The radio frequency front-end system of claim 1, wherein an output of the second radio frequency module is bypassed to facilitate cross-module connection between the first radio frequency module and the second radio frequency module.

10. The radio frequency front-end system of claim 9, wherein the output of the second radio frequency module is connected to an input of the first radio frequency module by the first signal trace or the second signal trace.

11. A mobile device comprising:
a transceiver configured to generate a first radio frequency transmit signal; and
a front-end system coupled to the transceiver, the front-end system including a first signal trace, a second signal trace, a third signal trace, and a first radio frequency module including a first plurality of switches, a second plurality of switches, a first power amplifier, a first bypass terminal connected to the first plurality of switches, a second bypass terminal connected to the second plurality of switches, and a first transmit terminal configured to receive the first radio frequency transmit signal, the third signal trace external to the first radio frequency module and connecting the first bypass terminal to the second bypass terminal, the front-end system further including a second radio frequency module including a third plurality of switches and a second power amplifier, the first radio frequency module and the second radio frequency module operable in a plurality of modes including a first mode in which the first power amplifier is bypassed and the first radio frequency transmit signal is provided to an input of the second power amplifier through the first plurality of switches, over the third signal trace, through the second plurality of switches, over the first signal trace, and through the third plurality of switches, the plurality of modes further including a second mode in which the first power amplifier amplifies the first radio frequency transmit signal and provides a first amplified radio frequency transmit signal to the second radio frequency module through the second plurality of switches, over the second signal trace, and through the third plurality of switches.

12. The mobile device of claim 11 further comprising a first antenna, a second antenna, a third antenna, and a fourth antenna.

13. The mobile device of claim 12 wherein the plurality of modes further includes a third mode in which a first radio receive signal received from the third antenna is provided to the first radio frequency module over the first signal trace.

14. The mobile device of claim 13 wherein the plurality of modes further includes a fourth mode in which a second radio receive signal received from the fourth antenna is provided to the first radio frequency module over the second signal trace.

15. The mobile device of claim 11, wherein the first radio frequency transmit signal has a frequency in a range of 3 gigahertz to 7.125 gigahertz.

16. The mobile device of claim 11, wherein the first radio frequency module includes a band-pass filter coupled to the second plurality of switches and having a passband corresponding to the n78 frequency band.

17. The mobile device of claim 11, wherein the first radio frequency module includes a band-pass filter coupled to the second plurality of switches and having a passband corresponding to the n77 or n79 frequency band.

18. The mobile device of claim 11, wherein an output of the second radio frequency module is bypassed to facilitate cross-module connection between the first radio frequency module and the second radio frequency module.

19. The mobile device of claim 18, wherein the output of the second radio frequency module is connected to an input of the first radio frequency module by the first signal trace or the second signal trace.

20. A method of front-end operation in a mobile device, the method comprising:
receiving a first radio frequency transmit signal as an input to a first radio frequency module of a front-end system, the first radio frequency module coupled to a second radio frequency module of the front-end system over a first signal trace and a second signal trace, the first radio frequency module including a first plurality of switches, a first power amplifier, a second plurality of switches, a first bypass terminal connected to the first plurality of switches, and a second bypass terminal connected to the second plurality of switches, the third signal trace external to the first radio frequency module and connecting the first bypass terminal to the second bypass terminal, and the second radio frequency module including a third plurality of switches and a second power amplifier;
operating the front-end system in a first mode, including bypassing the first power amplifier of the first radio frequency module, and providing the first radio frequency transmit signal to an input of the second power amplifier of the second radio frequency module through the first plurality of switches, over the third signal trace, through the second plurality of switches, over the first signal trace, and through the third plurality of switches; and
operating the front-end system in a second mode, including amplifying the first radio frequency transmit signal using the first power amplifier and providing a first amplified radio frequency transmit signal to the second radio frequency module through the second plurality of switches, over the second signal trace, and through the third plurality of switches.

\* \* \* \* \*